Patented Nov. 17, 1942

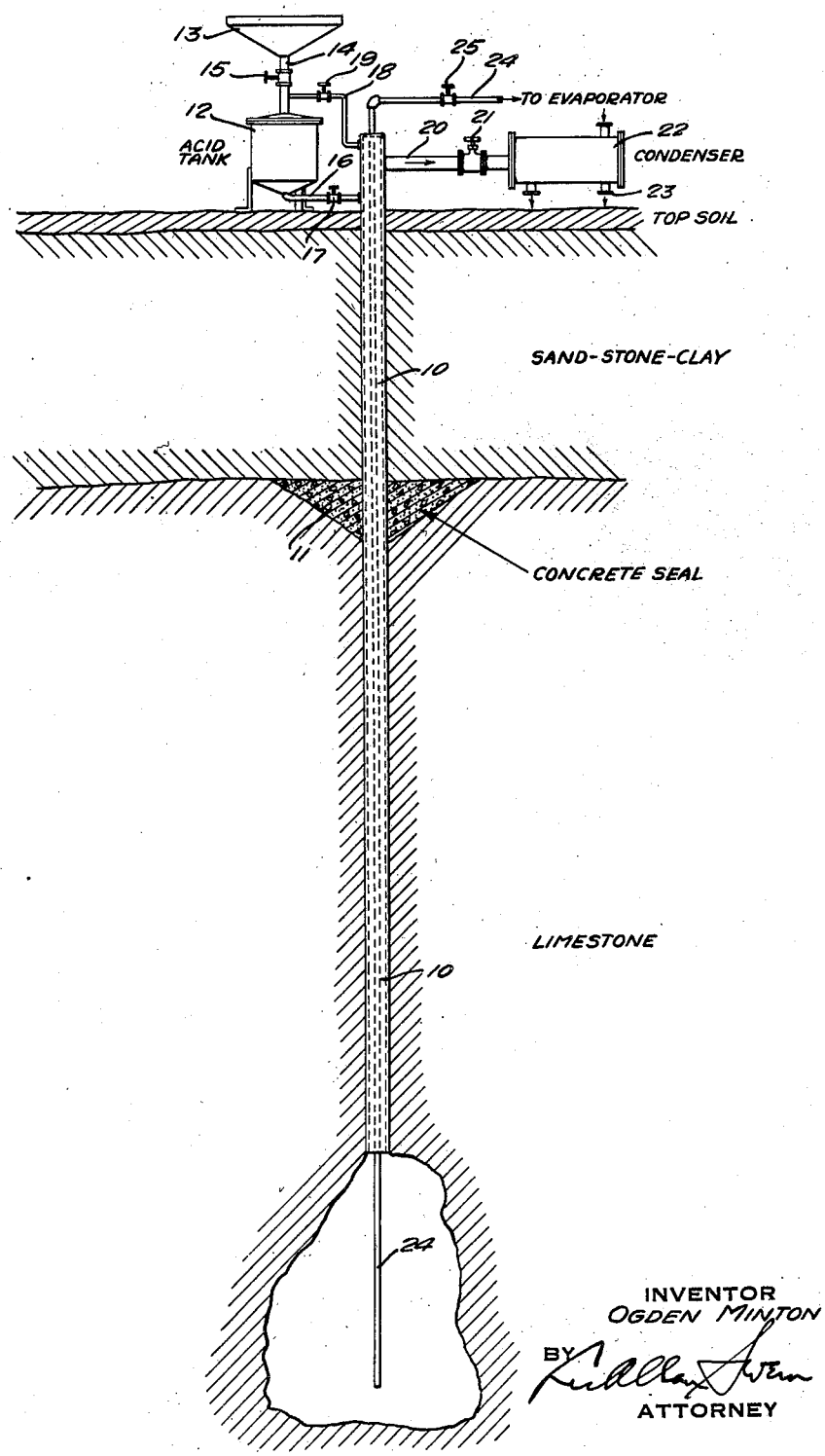

2,302,136

UNITED STATES PATENT OFFICE 2,302,136

METHOD AND APPARATUS FOR PRODUCING GASEOUS AND LIQUID CARBON DIOXIDE AND DRY ICE

Ogden Minton, Greenwich, Conn., assignor to Neva Minton, Greenwich, Conn.

Application January 20, 1940, Serial No. 314,744

10 Claims. (Cl. 62—121)

This invention relates to carbon dioxide and provides a novel method and novel apparatus for producing on a commercial scale liquid carbon dioxide from which dry ice can be made in the usual manner. Practice of the invention makes it possible to produce liquid carbon dioxide on a commercial scale in a much purer form and much more economically than heretofore. Expensive equipment such as compressors, scrubbing towers and other types of purifying means are eliminated.

The invention will be understood from the following description when considered in connection with the accompanying drawing forming a part thereof, and in which the single figure shows, more or less diagrammatically, a preferred form of apparatus for carrying out the process of producing liquid carbon dioxide in accordance with the invention.

Referring to the drawing, a well similar to an artesian well, is sunk in land having limestone underlying it, and a pipe 10 having its upper end closed, is fitted into the well and is sealed with cement or concrete 11 so that it is gas-tight. Pipe 10 should be made of material that is acidproof, or covered with a material that will protect it from corrosion, and it should be made to withstand very high pressure. Hydrochloric, or other suitable acid, is introduced into the upper end of the pipe 10 by any convenient means. As shown, the acid is delivered into a tank 12 through a funnel 13 and pipe 14 having a valve 15. The bottom of the tank is connected to the pipe 10 by a pipe 16 having a valve 17, and a pressure equalizing pipe 18 controlled by a valve 19 connects the upper end of pipe 10 with the pipe 14. When the tank is to be filled, valves 17 and 19 are closed and valve 15 is opened. After the tank has been filled, valve 15 is closed and valves 17 and 19 are opened and the acid in the tank will run into the pipe 10 and will run down the pipe 10 and into contact with the limestone at the bottom of the pipe. The acid will react with the limestone and will produce carbon dioxide gas If the acid is hydrochloric acid, the reaction will be defined by the following equation:

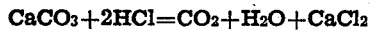

$$CaCO_3 + 2HCl = CO_2 + H_2O + CaCl_2$$

Carbon dioxide gas will be formed under high pressure, about 1200 pounds per square inch, and it will be forced up the pipe 10 and into pipe 20, controlled by valve 21, and delivered to a condenser 22, in which it is condensed to liquid form and withdrawn through line 23 to a receiver, not shown. The liquid carbon dioxide may be converted into dry ice by passing it through a valve into the chamber of a hydraulic press which will cause about half of the liquid to flash into gas and the other half to form carbon dioxide snow which can be compressed into blocks of dry ice.

The pressure in pipe 10 and at the bottom of the well can be controlled by the valve 21 and also by the amount of acid which is introduced into the well. The calcium chloride in solution in water which is formed as a result of the chemical reaction of the hydrochloric acid and limestone, will be forced up small pipe 24 which passes through pipe 10, through control valve 25 and delivered to an evaporator, not shown. When the pressure is released, much of the water will flash off as steam, and the remaining water can be evaporated to give dry calcium chloride, a by-product of some value. The acid used will be of such strength, that it will provide sufficient water preferably to hold the calcium chloride in a saturated solution.

By way of example, the well may be about eight inches in diameter and about 200 feet deep. Ordinarily, there is about ten inches of top soil and about twenty feet of sand, gravel, or clay and boulders covering limestone deposits which occur frequently throughout most of the world. The well should be sufficiently deep to insure that the pressure developed in the hole at the bottom of the pipe will not blow up the land above it. The well depth can be calculated for each drilling and the stone strength encountered.

Several tanks such as the tank 12 may be used so that one or more of the tanks can be filled while one is being emptied down the well. While hydrochloric acid is ordinarily preferred for the process, any other acid may be used. Hydrochloric acid can be obtained in large quantities as a waste product of chemical plants so that its use is relatively inexpensive. One objection to the use of sulphuric acid is that calcium sulphate will be formed and since it is only slightly soluble in water, it could not be forced up the small pipe 24. Additionally calcium sulphate is not as desirable a by-product as calcium chloride.

In some instances, it may be found desirable to utilize a small diameter pipe to conduct the acid to the bottom of the well. Moreover, a charge of explosive may be fired at the bottom of the well to break up the limestone to provide more area of stone for the acid to act upon and thus increase the capacity of the well.

Preferably, a limestone bed should be selected which is as free from fissures as possible and of as pure quality as possible. However, the carbon dioxide gas will result from a chemical reaction and hence will be very pure, since the impurities ordinarily found in limestone are such that they will not react with acid as a gas, and come out with the carbon dioxide gas. Some water in vapor form may have to be separated from the gas. Because of its high compression, the gas will be very hot and if found desirable, it can be used to help dry the calcium chloride or other reaction product, as well as evaporate water from it. Preferably, a site should be selected for the well which is adjacent a brook, or other source of cool water, for condensing and cooling purposes.

From the foregoing, it will be perceived that the present invention eliminates much expensive machinery and equipment, and a purer product is obtained than heretofore on a commercial scale. The chemical reaction compresses the carbon dioxide gas and the well acts as a retort for this reaction. In carrying out the process, there is nothing to cause stream polution and such water as is used is utilized merely as cooling water. Expensive machinery and equipment is eliminated and their initial cost and their cost of operation and maintenance saved. Preferably, the well should be located near a chemical plant which has waste hydrochloric acid available. Or, if this is not possible, hydrochloric acid can be made by using sulphuric acid and salt, the reaction producing salt cake and hydrochloric acid. The salt cake is a valuable by-product of this reaction, and can be treated to produce other by-products and much additional carbon dioxide gas. It is possible with the present invention, depending upon the price that can be obtained for the by-products, to produce liquid carbon dioxide, or dry ice as a by-product and at no cost.

The word "directly" in the claims, employed in conjunction with conducting gas to a heat exchanger from the well or a tubular member or the like associated with the well, means that the gas is conducted to the heat exchanger without substantial mechanical compression of the gas.

It will be understood that a preferred form of the process and the apparatus for carrying out the process, has been disclosed, and that changes may be made in the several steps of the process or in their sequence, and in the form, location and relative arrangement of the several parts of the apparatus without departing from the principles of the invention. Accordingly, it will be appreciated that the invention is not to be limited excepting by the scope of the appended claims.

What is claimed is:

1. The method of producing liquid carbon dioxide which comprises introducing acid into a substantially closed cavity located in the earth and into contact with limestone in said cavity to form carbon dioxide gas under pressure therein, conducting the gas under said pressure from the cavity to a heat exchanger, and subjecting the gas in the heat exchanger under said pressure to a temperature sufficiently low to condense the gas at the pressure prevailing thereon.

2. The method of producing liquid carbon dioxide which comprises introducing hydrochloric acid into a substantially closed cavity located in the earth and into contact with limestone in said cavity to form carbon dioxide gas under pressure therein, conducting the gas under said pressure from the cavity to a heat exchanger, and subjecting the gas in the heat exchanger under said pressure to a temperature sufficiently low to condense the gas at the pressure prevailing thereon.

3. The method of producing liquid carbon dioxide which comprises introducing acid into a substantially closed cavity located in the earth and into contact with limestone in said cavity to form carbon dioxide gas under pressure therein, conducting the gas under said pressure from the cavity to a heat exchanger, subjecting the gas in the heat exchanger under said pressure to a temperature sufficiently low to condense the gas at the pressure prevailing thereon, and removing the other reaction products from the cavity.

4. Apparatus for producing liquid carbon dioxide comprising means forming a substantially closed well in the earth in a region having limestone, means for introducing acid into the well for contact with the limestone therein whereby carbon dioxide gas is formed in the well under pressure, a heat exchanger, and a conduit through which the gas is conducted directly from the well to the heat exchanger wherein the gas is subjected to a temperature sufficiently low to condense the gas at the pressure prevailing thereon.

5. Apparatus for producing liquid carbon dioxide comprising means forming a substantially closed well in the earth in a region having limestone, means for introducing acid into the well for contact with the limestone therein whereby carbon dioxide gas is formed in the well under pressure, a heat exchanger, a conduit through which the gas is conducted directly from the well to the heat exchanger wherein the gas is subjected to a temperature sufficiently low to condense the gas at the pressure prevailing thereon, and another conduit through which the other reaction products are conducted from the well.

6. Apparatus for producing liquid carbon dioxide comprising a tubular member having one end open and sunk into a cavity in the earth in a region having limestone, and having its other end closed and disposed adjacent the surface of the earth, means for introducing acid into said member for contact with the limestone adjacent the lower end of the member to form carbon dioxide gas under pressure, a heat exchanger, and a conduit for conducting the gas so formed under pressure directly from the tubular member to the heat exchanger wherein the gas is subjected to a temperature sufficiently low to condense the gas at the pressure prevailing thereon.

7. Apparatus for producing liquid carbon dioxide comprising a tubular member having one end open and sunk into a cavity in the earth in a region having limestone, and having its other end closed and disposed adjacent the surface of the earth, means for introducing acid into said member for contact with the limestone adjacent the lower end of the member to form carbon dioxide gas under pressure, a heat exchanger, a conduit for conducting the gas so formed under pressure directly from the tubular member to the heat exchanger wherein the gas is subjected to a temperature sufficiently low to condense the gas at the pressure prevailing thereon, and another conduit through which the other reaction products are withdrawn from the cavity.

8. Apparatus for producing liquid carbon dioxide comprising means forming a substantially closed well in the earth in a region having limestone, means for introducing acid into the well for contact with the limestone therein whereby carbon dioxide gas is formed in the well under pressure, a heat exchanger, a conduit through which the gas is conducted directly from the well to the heat exchanger wherein the gas is subjected to a temperature sufficiently low to condense the gas at the pressure prevailing thereon, and valve means for controlling the conduit to control the pressure in the well.

9. Apparatus for producing liquid carbon dioxide comprising means forming a substantially closed well in the earth in a region having limestone, means for introducing acid into the well for contact with the limestone therein whereby carbon dioxide gas is formed in the well under pressure, a heat exchanger, a conduit through which the gas is conducted directly from the well to the heat exchanger wherein the gas is subjected to a temperature sufficiently low to condense the gas at the pressure prevailing thereon, valve means for controlling the conduit to control the pressure in the well, another conduit through which the other reaction products are conducted from the well, and valve means for controlling the other conduit.

10. Apparatus for producing liquid carbon dioxide comprising a tubular member having one end open and sunk into a cavity in the earth in a region having limestone, and having its other end closed and disposed adjacent the surface of the earth, means for introducing acid into said member for contact with the limestone adjacent the lower end of the member to form carbon dioxide gas under pressure, a heat exchanger, a conduit for conducting the gas so formed under pressure directly from the tubular member to the heat exchanger wherein the gas is subjected to a temperature sufficiently low to condense the gas at the pressure prevailing thereon, another conduit through which the other reaction products are withdrawn from the cavity, valve means for controlling the conduit to control the pressure in the cavity, and valve means for controlling the other conduit.

OGDEN MINTON.